INVENTOR
WILLIAM PARKER
BY
ATTORNEY

Patented Nov. 21, 1933

1,935,989

UNITED STATES PATENT OFFICE 1,935,989

LAMP MAKING MACHINERY

William Parker, Oak Park, Ill., assignor to Grigsby-Grunow Company, Chicago, Ill., a corporation of Illinois Application April 24, 1930. Serial No. 446,903

7 Claims. (Cl. 49—2)

This invention relates to lamp making machinery and particularly to machinery for the manufacture of presses. In prior machinery of this character a revolving turret having a plurality of heads mounted thereon, and adapted to index from one position to another is provided. Each head, as a rule, consists of a weld pocket comprising a solid block having a number of recesses therein for the reception of the welds. Suitable clamps are provided to hold glass tubing in predetermined position to the welds, so that the welds and glass may be suitably sealed to form a press. Such machines have many inherent defects. Thus the weld pocket with its small recesses has occasioned difficulty in loading. The recesses in such weld pockets must be just large enough so that the welds fit snugly therein in order that the latter may be maintained correctly in relative positions. The requirement for snug fitting has therefore resulted in many defective articles, because of dirt getting into the weld pocket and either clogging up the recesses or causing the weld to stick.

Another difficulty lay in the fact that each head was in such intimate contact with the body of the machine that there was considerable conduction of heat from the head which is exposed to gas flames. This tended to unify the entire machine, as far as heat was concerned, with the result that unavoidable variations in temperature of the machine due to changes in room temperature or the like were communicated to each head. This resulted in a change of the relative positions and lengths of the various levers and clamps and threw the parts of the head out of alignment. This effect is serious in the manufacture of such small lamps as those used for automobile headlights since a change of only a few thousandths of an inch in the location of the parts would result in a defective lamp.

Furthermore, because the entire machine tended to become hot, difficulties were encountered in lubricating moving parts.

An object of this invention is to devise a weld pocket which may be easily loaded and unloaded and which may be cleaned with a minimum of difficulty.

Another object is to devise a head which may be mounted on the turret in such a way that a minimum of heat will be transmitted from the head to the body of the machine. In this way, a head will tend to maintain a constant temperature when heated by the gas flames. Another object is to devise a head having clamping mechanism which is simple and positive and which will not easily get out of alignment with the weld pocket and which may be simply and accurately adjusted. An additional object is to devise simple and positive mechanism for operating the various clamps of each head so that a minimum of parts is required while permitting of the efficient operation of the head.

Other objects will be apparent to those skilled in the art, as the description proceeds.

In the drawings:

Figure 7 is a detailed view partly in section of one of the upper jaws showing the adjusting means.

Figure 8 is a view of the weld pocket taken apart.

Figure 9 is a side view of the assembled weld pocket.

The machine in general comprises a circular turret 1, which is actuated by suitable mechanism, not shown, in such manner that it intermittently indexes from one position to another. Turret 1 is provided with a plurality of peripherally disposed slots 2, into which are suitably clamped heads 3.

Figure 6:
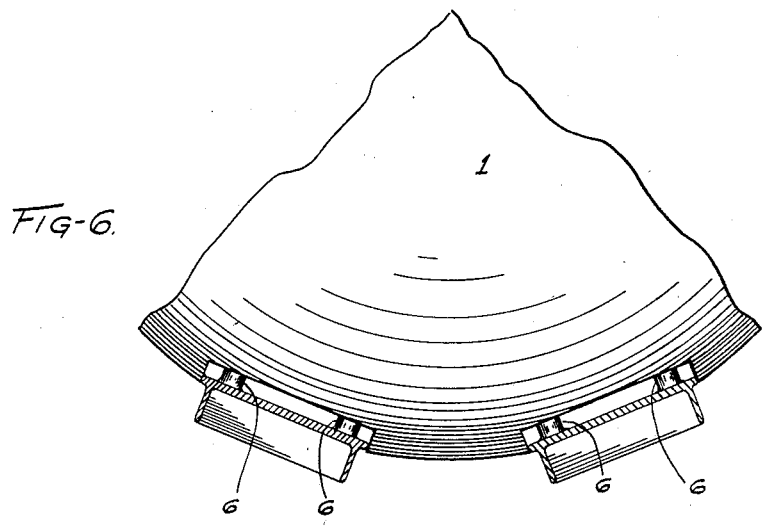
Figure 6 is a view showing a portion of the turret and sections of heads taken on line 6—6 of Figure 4.

Each head comprises a baseblock 4, the top portion of which is shaped to form a yoke 5. As is well known each head is exposed to intense gas flames and remains hot during the operation of the machine. In order to impede the conduction of heat from block 4 to turret 1 a number of bosses 6 are provided, so that there is a minimum of metal to metal contact for mounting purposes. These bosses are provided with suitable apertures registering with tapped recesses in slots 2, into which bolts 7 are threaded. Thus it is clearly evident from Figure 6 that the only metallic contact between blocks 4 and turret 1 is at bosses 6 and the very edges of block 4.

At the junction of block 4 and yoke 5 a jaw 10 projects. While this jaw is shown as being integral with the block it may be made as a separate piece and bolted thereon. A co-operating jaw 11, is pivotally mounted by means of a pin 12 passing through the open space within yoke 5 and suitably supported in recesses in the block and yoke. In order to limit the amount of opening of jaw 11, with respect to jaw 10, an arm 12 projecting from block 4 carries a bolt 13, and lock nut 14 which cooperates with a depending flange of jaw 11.

Figure 1:
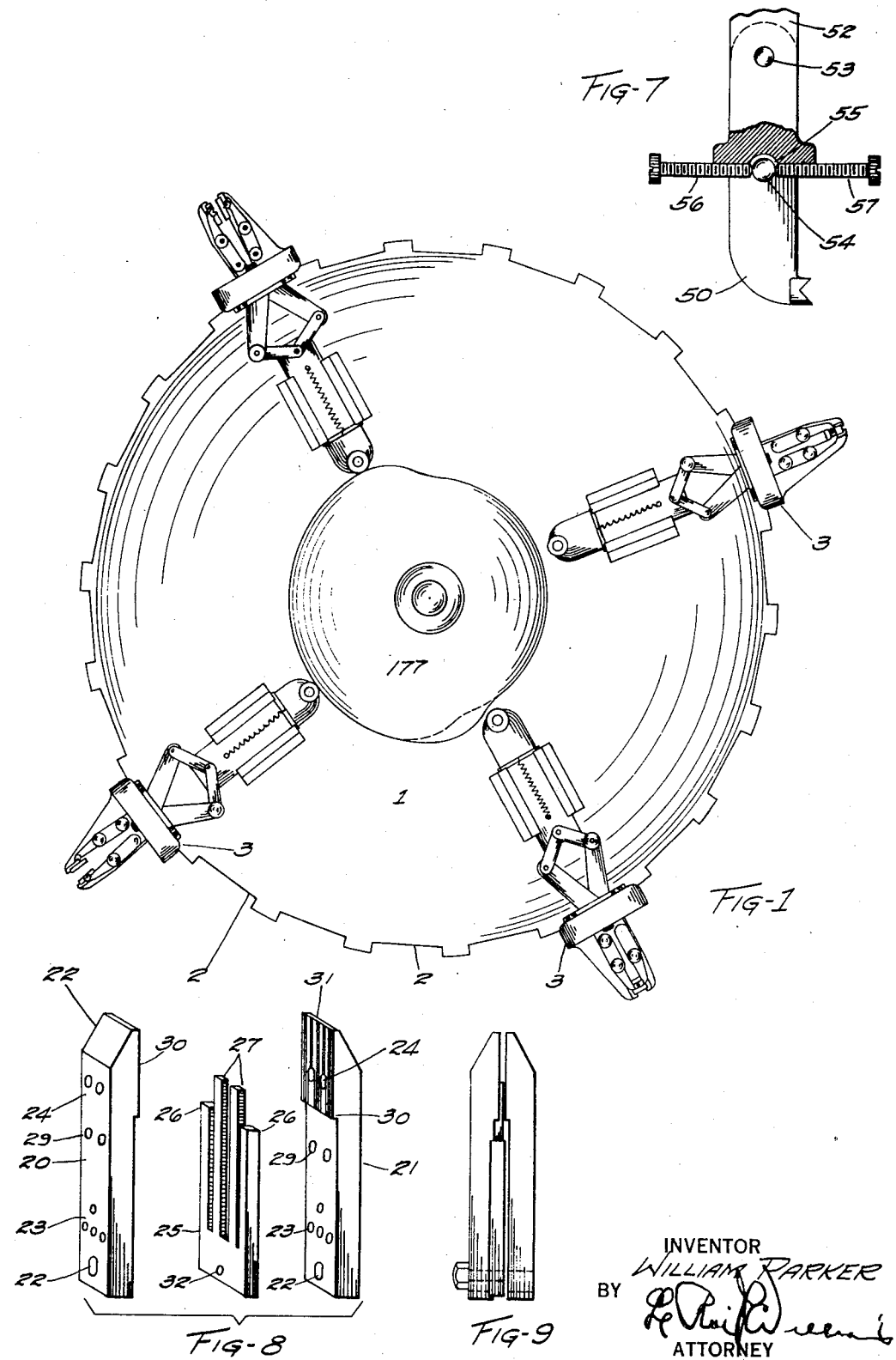
Figure 1 is a plan view looking down upon a machine provided with four heads.
Figure 2:
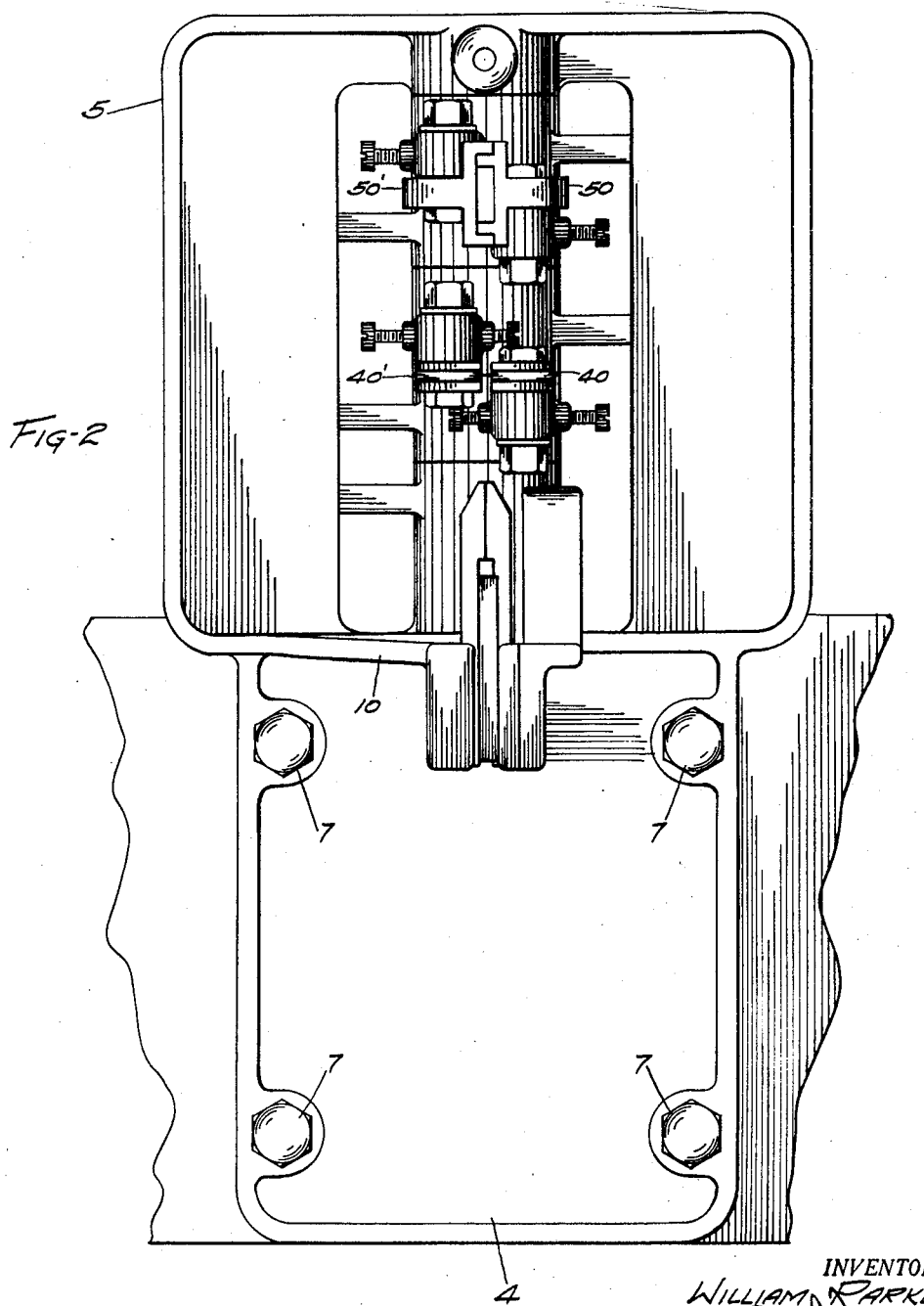
Figure 2 is a front view showing one of the heads.
Figure 3:
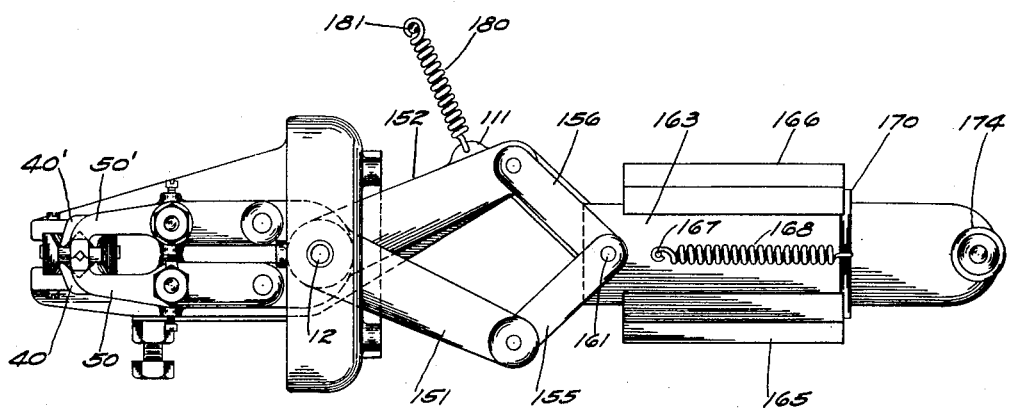
Figure 3 is an enlarged plan view of a head.
Figure 4:
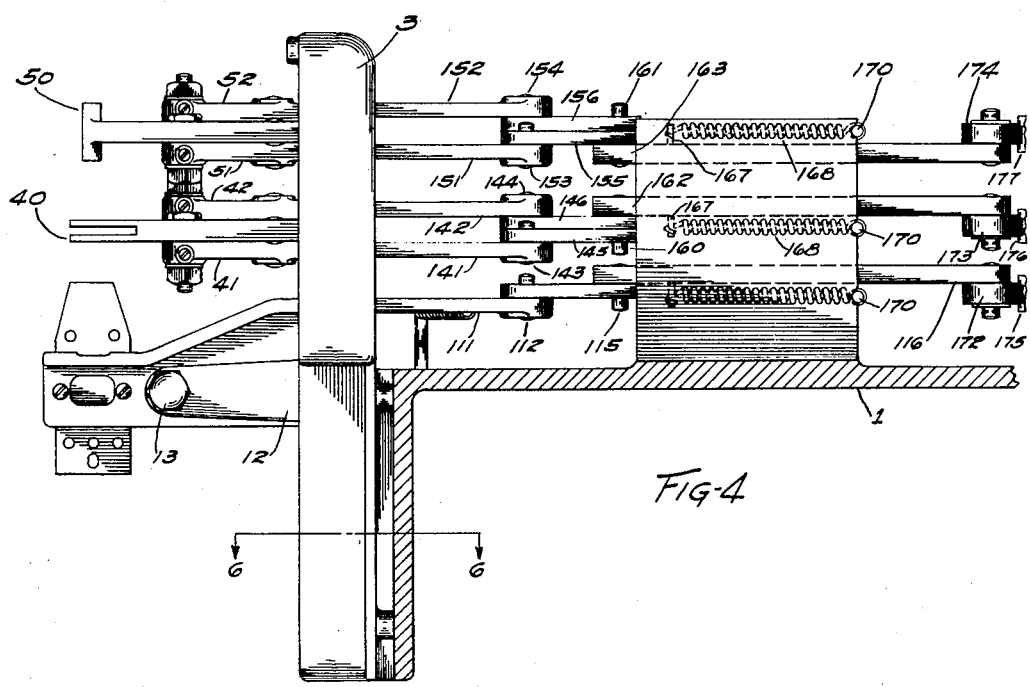
Figure 4 is a side view of the head shown in Figure 3.
Figure 5:
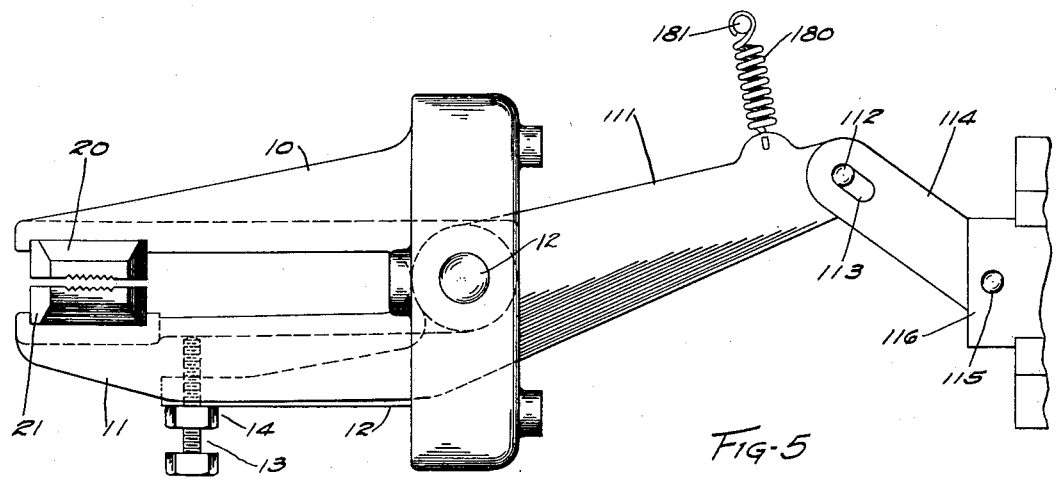
Figure 5 is a plan view of a head with upper jaws removed.

Bolted within suitable slots in jaws 10 and 11 are members 20 and 21 comprising a split weld pocket. Each member comprises an elongated portion having a rectangular cross section and provided with a tapering top 22. A plurality of apertures 22, 23 and 24 is provided for purposes to be later described. A spacer member 25 is provided with a plurality of spaced upstanding portions 26 and 27. It will be noted that both members 20 and 21 are cut away to form a projecting surface 30. Surface 30 of both members is provided with channels 31 so that a serrated effect, as shown in Figure 5, results.

By pressing members 20 and 21 and spacer 25 together, as shown in Figure 9, a compact weld pocket will be formed in which spacer 25 and upstanding portions 26 will fit snugly between members 20 and 21 and below surface 30. Upstanding portions 27 of the paper will project upwardly between opposing surface 30 and will fit snugly into the channels formed therein. The resulting weld pocket will thus have internal recesses for the reception of weld wires. By suitably determining the dimensions and number of the upstanding portions of spacer 25 and the corresponding channels in members 20 and 21 a weld pocket will result in which any number of welds may be inserted in predetermined relative positions and to a predetermined depth.

Spacer 25 may be bolted to either member 20 or 21. As shown, this spacer member is joined to member 20 by means of a bolt passing through aperture 22 and a registering aperture 32 in spacer 25. Apertures 22 in both members 20 and 21 are preferably elongated so that the vertical position of the spacer may be adjusted with relation to the two members. Members 20 and 21 are then bolted to arms 10 and 12 respectively, the bolts passing through these arms and engaging tapped recesses 29.

Apertures 23 and 24 give access to the interior of the weld pocket. In order to clean the interior, blasts of air may be directed through any one or more of these apertures and blow dust and particles out.

Above jaws 10 and 11 are mounted two pairs of clamping jaws 40, 40' and 50, 50'. These jaws have their cooperating ends terminate in line with the weld pocket and are adapted to support glass tubing in the customary manner. Each pair of jaws is pivotally carried by arms 41, 42, 51 and 52, respectively. Since the jaws are similarly mounted, a detailed description of one will suffice for all. In Figure 7, the jaw 50' is shown as mounted on arm 52 by means of a pivot pin 53. In this particular instance jaw 50' lies beneath a portion of arm 52, whereas the cooperating jaw 50, supported on arm 51 is above said arm. Jaw 50' carries a pin 54 fixedly secured thereto and projecting upwardly into an enlarged opening 55 in arm 52. A pair of adjusting bolts 56 and 57 are suitably threaded into arm 52 on opposite sides of pin 54. It is clear that jaw 50' may be clamped into any pre-determined position with relation to arm 52, by adjusting bolts 56 and 57. By mounting each pair of jaws on opposite sides of the arms proper clearance of the adjusting mechanism is obtained.

Arms 11, 41, 42, 51 and 52 are pivotally mounted in a vertical axis by means of pin 12. It will be noted that all of these arms are in different plans and have portions projecting beyond the yoke toward the turret. Arm 11 has a portion 111, whose end carries a pin 112. This pin is adapted to engage an elongated slot 113, in a lever 114, pivotally mounted at 115 to a sliding block 116.

Arms 41, 42, 51 and 52 have corresponding portions 141, 142, 151 and 152 projecting beyond yoke 5. Each arm 141, 142, 151 and 152 is inclined to the opposite side of the axis of the head from the corresponding portions 41, 42, 51 and 52, and is suitably pivoted at 143, 144, 153 and 154 to links 145, 146, 155 and 156, respectively. Each pair of links 145, 146, 155 and 156 is pivoted at 160 and 161 respectively, to sliding blocks 162 and 163.

The actuating means to operate the various pairs of jaws are the sliding blocks 116, 162 and 163. Each of these blocks is adapted to engage grooves in and be supported at its edges by spaced parallel guides 165 and 166 supported on the turret. Springs 168 engage pins 167 on blocks 116, 162 and 163 and pins 170 transversely supported by notches in the ends of guides 165 and 166. By virtue of springs 168 each of the three sliding blocks is biased in such a manner as to tend to close the various pairs of cooperating jaws. Blocks 116, 162 and 163 carry cam rollers 172, 173 and 174 at their ends which are adapted to cooperate with the periphery of three cams 175, 176 and 177.

Jaws 40, 40' and 50, 50' are opened by the cooperation of rollers 173 and 174 and the rises on their respective cam surfaces. Inasmuch as these two pairs of jaws may be simultaneously operated, it may be desirable to have one large cam for both rollers. The closing of jaws 40, 40' and 50, 50' is accomplished by the spring bias of the toggles acting when the cam surfaces 176 and 177 are clear of the corresponding rollers.

Because of the minute movement of jaw 11, relative to jaw 10, it is desirable to have an appreciable movement of sliding block 116 and provide a means for taking up undesired motion. To this end a spring 180 is provided which engages an end of arm 111 and a pin 181 on the turret of the machine. Cam surface 175 bears against roller 172 of block 116 and the rise on it forces the block outwardly toward the jaws. Because of the link connection and the elongated slot 113, it is possible to have an appreciable rise on cam 175, and an appreciable movement of block 116, when only small motion in arm 111 and jaw 11 is necessary. It is clear that as soon as block 116 is forced outwardly toward the head, spring 180 opens jaw 11 as far as stop 13 permits.

The split block may be applied to all kinds of machines where members are loaded in recesses to be operated upon and then withdrawn.

By arranging the jaws as shown a minimum number of pivot pins is necessary while positive operation is secured. The various parts are easily accessible for inspection and repair while the arrangement is susceptible to quick and accurate adjustment.

I claim:

1. In a stem machine, the combination of a turret adapted to index from one position to another, a plurality of heads mounted thereon, each head including a weld pocket, said weld pocket comprising a pair of complementary members, each mounted upon the end of a pair of relatively movable levers, said members having grooves formed along the operating surfaces thereof, one of said members having stops at a predetermined distance along said grooves, and means for obtaining relative motion of said levers to an extent whereby said members are separated enough to enlarge said grooves without rendering said stops ineffective, said weld pockets being adapted to have wires inserted therein and removed therefrom during the operation of the machine.

2. In a stem machine, the combination of a turret adapted to index from one position to another, said turret having a peripherally disposed flange, a plurality of heads, each of said heads including work-holding jaws adapted to be exposed to intense heat, and means for supporting said heads on said turret, said means including a massive base block juxtaposed against said turret flange, and a plurality of bosses forming the sole metallic connection between said turret flange and said base block.

3. In a stem machine, the combination of a turret adapted to index from one position to another and provided with a peripherally disposed dependent flange, a plurality of heads, each head comprising work-holding jaws adapted to be exposed to intense heat, and means for supporting said heads on said turret so that a minimum of heat transfer occurs between said heads and turret, said means including a massive base block disposed opposite to said turret flange, and a plurality of bosses forming the sole connection between said turret flange and base block.

4. In a stem machine, the combination of a turret adapted to index from one position to another, a plurality of heads mounted thereon, each head being adapted to be exposed to intense heat and comprising a plurality of pairs of superposed work-holding clamps, and means for mounting said heads on said turret, said means comprising a massive base block disposed opposite a portion of said turret, a plurality of bosses forming the sole connection between said base block and said turret, and an arched member having a pivot pin therethrough for supporting said clamps, said arched member extending above said base block.

5. In a stem machine, the combination of a turret adapted to index from one position to another and provided with a peripherally disposed flange, a plurality of heads adapted to be exposed to intense heat, each head comprising a plurality of pairs of superposed work-holding clamps, and means for mounting each head on said turret, said means comprising a massive base block having a plurality of bosses disposed opposite said flange, said bosses forming the sole connection between said flange and said base block, said base block including an arched member extending upward therefrom, and a single pin passing through said clamps and supported in said arch.

6. In a stem machine, the combination of a turret adapted to index from one position to another, a plurality of stem heads mounted thereon, each head comprising a plurality of pairs of superposed work-holding clamps, a pair of vertically disposed guide blocks mounted on said turret for each head, said guide blocks disposed inwardly toward the center of said turret and substantially in radial alignment with each head, levers extending from said clamps substantially horizontally, the various levers being superposed and adapted to slide within said guide blocks for operating said clamps, a plurality of cams mounted at the center of said turret, and substantially in the same horizontal plane as said clamps, and means for operating said superposed levers from said guides as said turret indexes.

7. In a stem machine, the combination of a turret adapted to index from one position to another, said turret having a dependent peripheral flange, a plurality of stem-making heads, means for mounting each head on said turret, said means comprising a massive mounting block having a plurality of bosses thereon, said mounting block being adapted to be mounted on said flange at said bosses, each mounting block being provided with a superposed yoke, each head comprising a plurality of superposed work-holding clamps, a single pivot pin vertically disposed in said yoke for maintaining said stem head clamps, a linkage system extending substantially horizontally toward the center of said turret from the inner ends of each clamp, said linkage systems being superposed, means on said turret for supporting said linkages in said superposed positions, a plurality of cams at the center of said turret, and means for operating said linkages from said cams.

WILLIAM PARKER.